United States Patent [19]

Krisher

[11] Patent Number: 5,176,591
[45] Date of Patent: Jan. 5, 1993

[54] PLANETARY GEAR DIFFERENTIAL WITH DISCONNECT

[75] Inventor: James A. Krisher, Fort Wayne, Ind.
[73] Assignee: Dana Corporation, Toledo, Ohio
[21] Appl. No.: 810,696
[22] Filed: Dec. 19, 1991
[51] Int. Cl.[5] ............................................. F16H 1/42
[52] U.S. Cl. ........................................ 475/252; 475/86; 475/131; 475/248; 475/298; 180/247
[58] Field of Search ................ 475/86, 131, 248, 252, 475/298; 180/247

[56] References Cited

U.S. PATENT DOCUMENTS

| | | | |
|---|---|---|---|
| 677,771 | 7/1901 | Birdsall | 475/250 |
| 762,674 | 6/1904 | Austin | 475/250 |
| 915,920 | 3/1909 | Winton et al. | 475/252 |
| 1,018,553 | 2/1912 | Cullman | 475/250 |
| 1,108,800 | 8/1914 | Shrader | 475/223 |
| 1,203,085 | 10/1916 | Wallace | 475/250 |
| 1,240,551 | 9/1917 | Farrell | 475/250 |
| 1,680,134 | 8/1928 | Dennison | 475/250 |
| 1,690,189 | 11/1928 | Dennison | 475/250 |
| 1,760,839 | 5/1930 | Drew | 475/252 |
| 2,699,075 | 1/1955 | Buckendale | 180/24.09 |
| 2,803,150 | 8/1957 | Fisher | 475/150 |
| 3,107,763 | 10/1963 | Hill | 192/41 R |
| 3,191,708 | 6/1965 | Simonds et al. | 180/250 |
| 3,375,736 | 4/1968 | Saari | 475/252 X |
| 3,528,323 | 9/1970 | Kamlukin | 475/252 X |
| 3,557,634 | 1/1971 | Bixby | 475/160 |
| 3,768,336 | 10/1973 | Wharton | 475/248 X |
| 4,313,518 | 2/1982 | Ledwinka et al. | 180/233 |
| 4,341,281 | 7/1982 | Nagy | 180/247 |
| 4,497,220 | 2/1985 | Grinde | 475/298 |
| 5,055,096 | 10/1991 | Rienischeid et al. | 475/252 X |

Primary Examiner—Leslie A. Braun
Assistant Examiner—Benjamin Levi
Attorney, Agent, or Firm—MacMillan, Sobanski & Todd

[57] ABSTRACT

An internal disconnect mechanism for a planetary gear differential permits operation in either an engaged mode, wherein a driving connection is provided therethrough, and in a disengaged mode, wherein no driving connection is provided. The differential includes a case which is rotatable about an axis having first and second spur gears disposed therein, each adapted to be connected to an output shaft for rotation therewith. A first plurality of planetary gears mounted for rotation within the case mesh with the first spur gear and are axially immovable. A second plurality of planetary gears mounted for rotation within the case mesh with the second spur gear. Unlike the first planetary gears, however, the second planetary gears are axially movable between engaged and disengaged positions. In the engaged position, each of the second planetary gears meshes with a corresponding one of the first planetary gears. Thus, the differential functions in a normal manner. In the disengaged position, the second planetary gears do not mesh with any of the first planetary gears. As a result, the spur gears rotate freely relative to the differential case. The axial movement of the second planetary gears may be effected by a spring-loaded vacuum actuator or by a mechanical linkage.

12 Claims, 5 Drawing Sheets

PLANETARY GEAR DIFFERENTIAL WITH DISCONNECT

BACKGROUND OF THE INVENTION

This invention relates in general to differential gear mechanisms and in particular to an improved structure for a planetary gear differential which is selectively operable in either an engaged mode, wherein a driving connection is provided therethrough, and in a disengaged mode, wherein no driving connection is provided.

Differential gear mechanisms, commonly referred to simply as differentials, are well known devices which are frequently used in the drive train systems of most vehicles. The differential is usually connected between an input driving shaft (typically a drive shaft from the vehicle engine) and a pair of output driven shafts (typically a pair of axle shafts connected to the vehicle wheels). The differential distributes torque from the input shaft equally to the two output shafts, while permitting such output shafts to rotate at different speeds under certain conditions. As a result, torque is supplied to both wheels of the vehicle as it negotiates a turn, while permitting the outside wheel to turn faster than the inside wheel.

Differentials are commonly used in four wheel drive systems, wherein a transfer case divides power from the vehicle engine between a primary pair of wheels and a secondary pair of wheels. In these systems, a differential is provided for each of the primary and secondary pairs of wheels. During four wheel drive operation, power is transmitted from the transfer case through the primary and secondary differentials to the primary and secondary pairs of wheels, respectively, in the manner described above. Four wheel drive systems of this general type are commonly found in off road vehicles because all four of the vehicle wheels are powered to drive the vehicle on low traction surfaces.

Some four wheel drive systems provide a mechanism for disconnecting the driving connection between the transfer case and the secondary differential such that the secondary pair of wheels is not driven by the vehicle engine. These part-time four wheel drive systems are advantageous because four wheel drive operation is undesirable when the vehicle is driven on roads or other high traction surfaces. In those situations, four wheel drive operation is inefficient from a fuel economy standpoint and causes unnecessary wear. By providing a transfer case with a mechanism for disconnecting the driving connection between the transfer case and the secondary differential, the vehicle can be operated efficiently in both on-road and off-road situations.

Unfortunately, even when the driving connection between the transfer case and the secondary differential is disconnected, the secondary pair of wheels back-drives the components of the secondary differential. This back driving action is undesirable for the same reasons described above. Thus, it is known to provide an internal mechanism within the secondary differential for disconnecting the driving connection between some or all of the components therein and the secondary pair of wheels. As a result, the secondary pair of wheels is permitted to rotate freely and create little drag on the vehicle engine.

SUMMARY OF THE INVENTION

This invention relates to an improved structure for an internal disconnect mechanism for a planetary gear differential which permits operation in either an engaged mode, wherein a driving connection is provided therethrough, and in a disengaged mode, wherein no driving connection is provided. The differential includes a case which is rotatable about an axis. First and second spur gears are provided within the case, each adapted to be connected to an output shaft for rotation therewith. A first plurality of planetary gears is mounted for rotation within the case. The first planetary gears mesh with the first spur gear and are axially immovable. A second plurality of planetary gears is also mounted for rotation within the case. The second planetary gears mesh with the second spur gear. Unlike the first planetary gears, however, the second planetary gears are axially movable between engaged and disengaged positions. In the engaged position, each of the second planetary gears meshes with a corresponding one of the first planetary gears. Thus, the differential functions in a normal manner. In the disengaged position, the second planetary gears do not mesh with any of the first planetary gears. As a result, the spur gears rotate freely relative to the differential case. The axial movement of the second planetary gears may be effected by a spring-loaded vacuum actuator or by a mechanical linkage.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
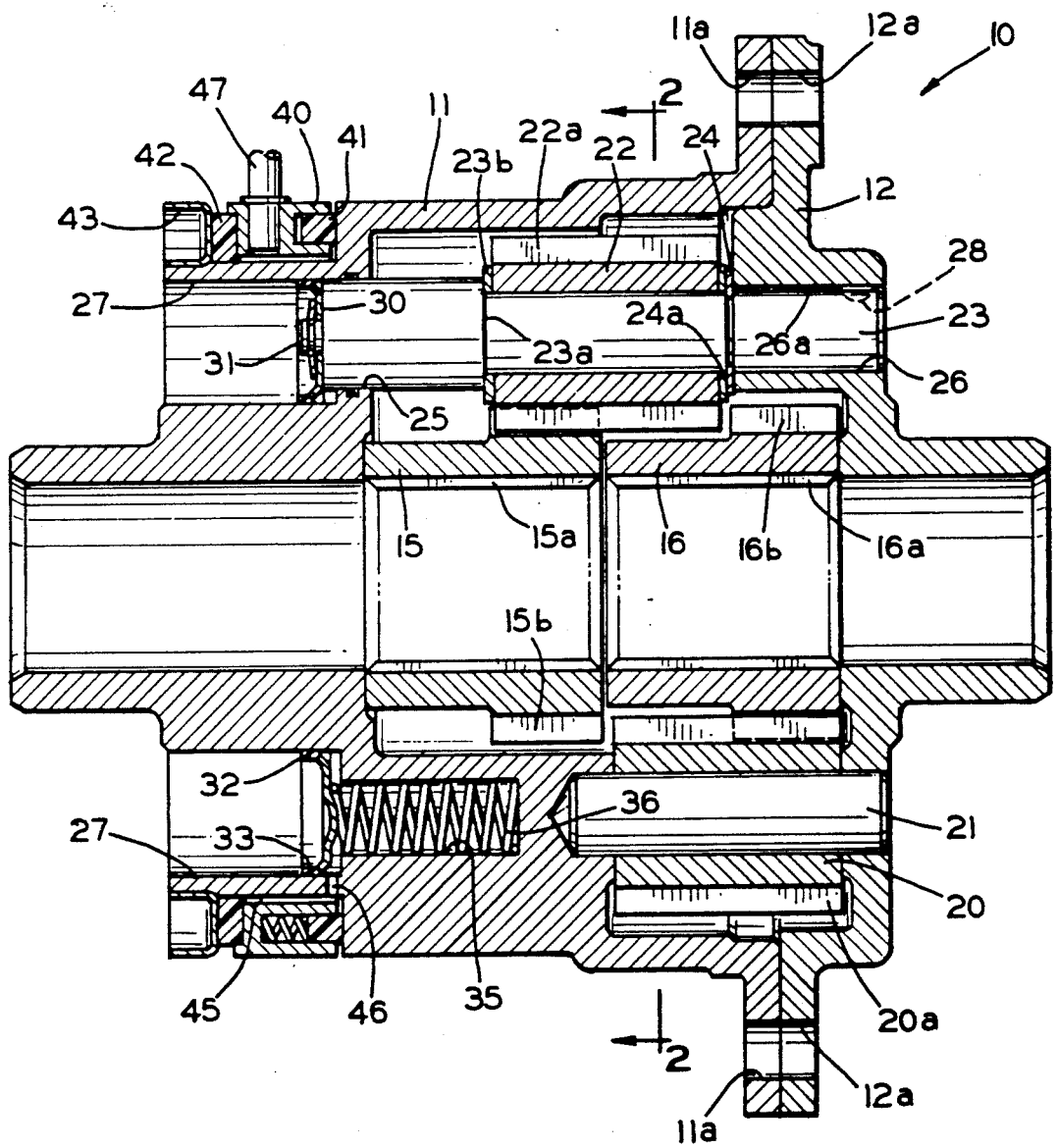
FIG. 1 is a sectional elevational view of a first embodiment of a differential having an internal disconnect mechanism in accordance with this invention, the view taken along line 1—1 of FIG. 2, wherein the components of the differential shown in an engaged mode.
Figure 2:
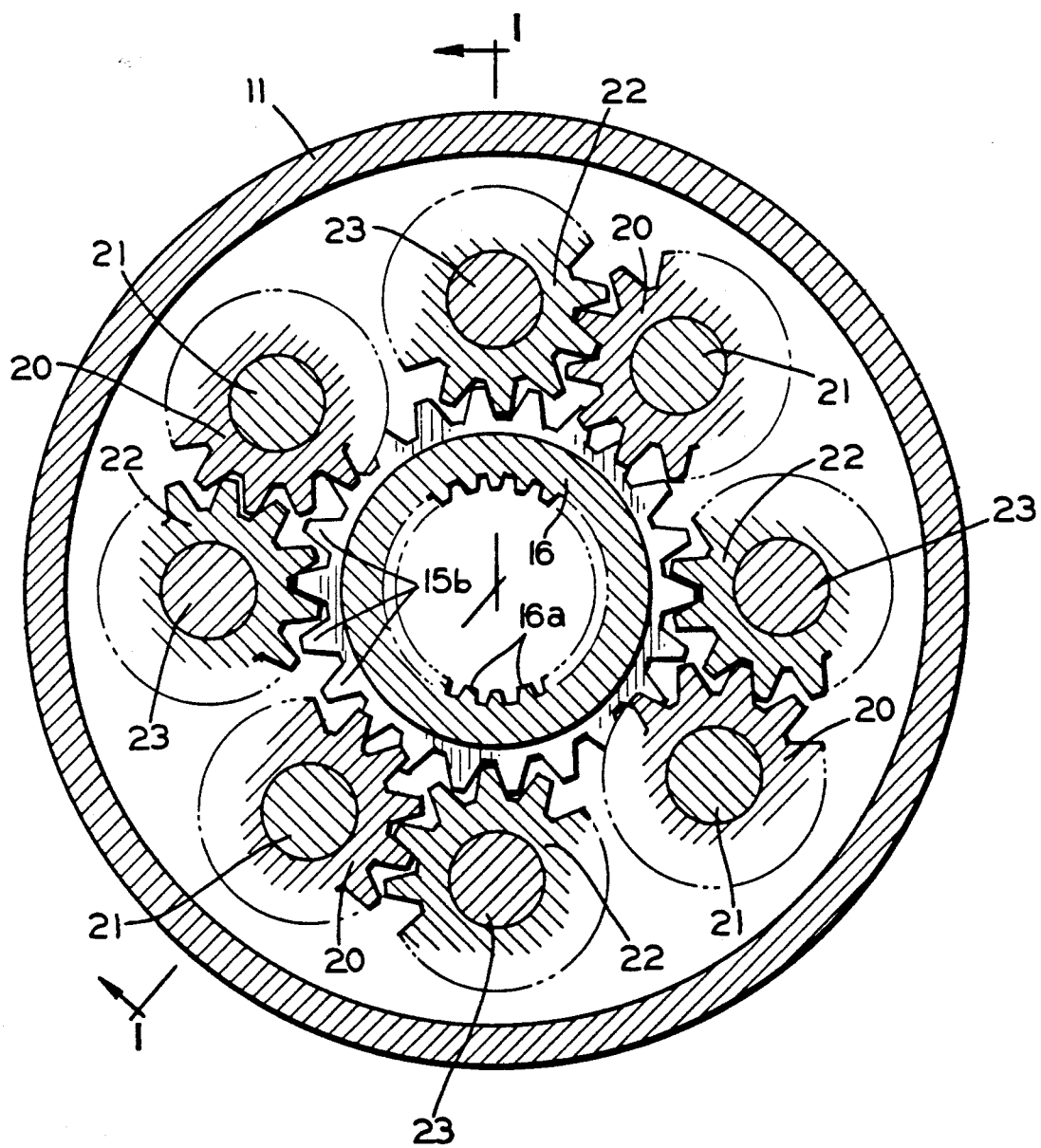
FIG. 2 is a sectional elevational view of the differential taken along line 2—2 of FIG. 1.
Figure 3:
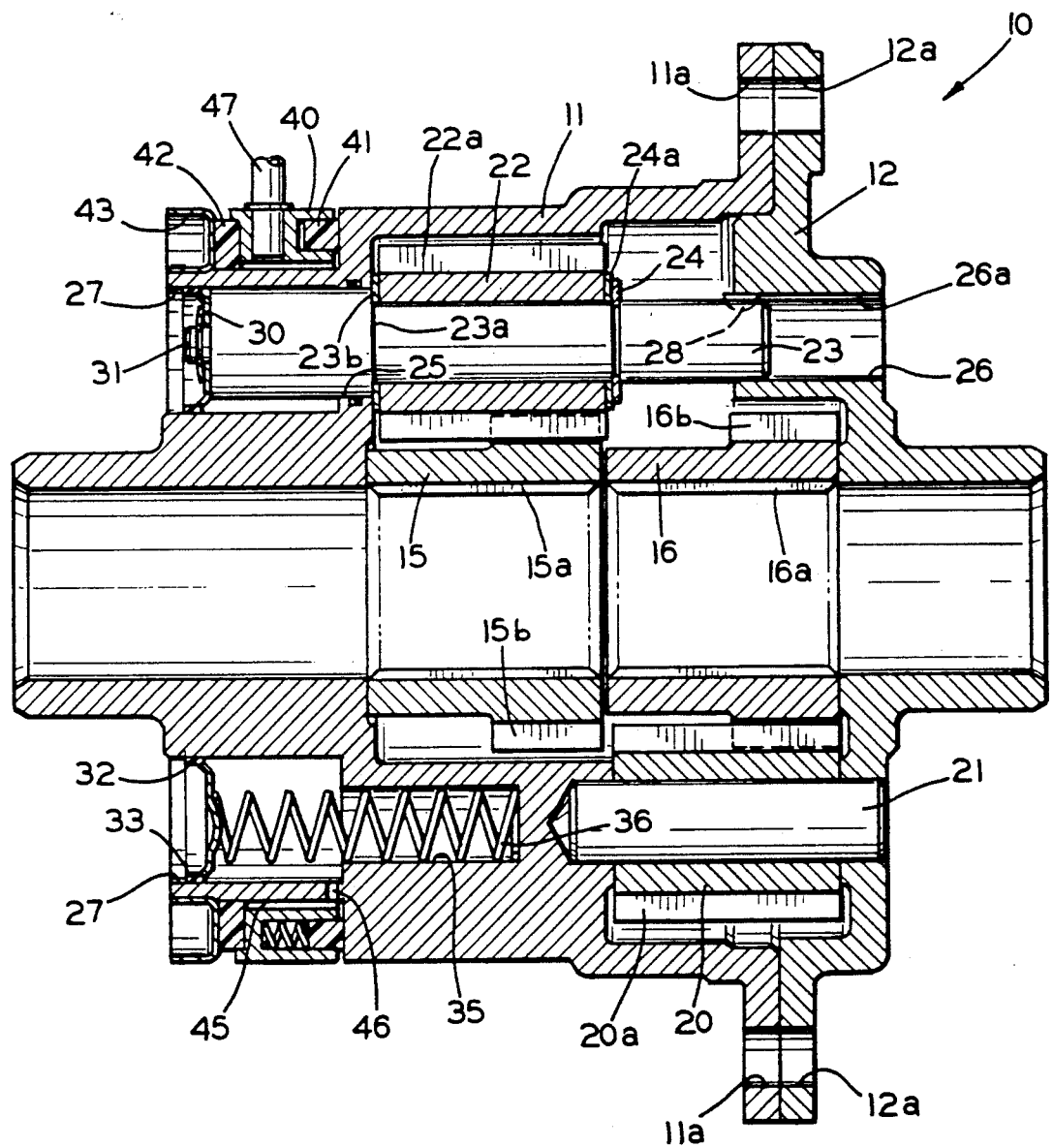
FIG. 3 is a sectional elevational view similar to FIG. 1 wherein the components of the differential are shown in a disengage mode.

Referring now to the drawings, there is illustrated in FIGS. 1 through 3 a first embodiment of a differential, indicated generally at 10, in accordance with this invention. The differential 10 is contained within a case formed from left and right case halves 11 and 12. A plurality of axially aligned apertures 11a and 12a are formed through the case halves 11 and 12, respectively. The apertures 11a and 12a are provided to receive threaded fasteners (not shown) therein to secure the two case halves 11 and 12 together in a known manner. Also, the apertures 11a and 12a permit a conventional ring gear (not shown) to be secured to the case of the differential 10. As is well known, the ring gear cooperates with a pinion gear (not shown) provided on the end of a drive shaft for rotating the differential 10 about an axis.

Left and right spur gears 15 and 16 are provided within the case of the differential 10. The spur gears 15 and 16 have internal splines 15a and 16a respectively formed thereon to permit them to be connected to respective axle shafts (not shown). The axle shafts extend outwardly from the differential 10 to respective wheels driven thereby. The spur gears 15 and 16 also have external teeth 15b and 16b respectively formed thereon. The purpose of these teeth 15b and 16b will be explained in detail below.

As best shown in FIG. 2, a first plurality of planetary gears 20 is provided within the differential 10. In the illustrated embodiment, four of such first planetary gears 20 are provided, each having a plurality of external teeth 20a formed thereon. The teeth 20a of each of the first planetary gears 20 mesh with the teeth 16a of the right spur gear 16. The first planetary gears 20 are mounted for rotation on respective shafts 21 journalled in the left and right case halves 11 and 12. The shafts 21 are press fit or otherwise retained to the case halves 11 and 12 to prevent relative axial movement. The first planetary gears 20 are restrained from axial movement relative to the shafts 21 by the inner surfaces of the case halves 11 and 12.

Similarly, a second plurality of planetary gears 22 is provided within the differential 10. In the illustrated embodiment, four of such second planetary gears 22 are provided, each having a plurality of external teeth 22a formed thereon. The teeth 22a of each of the first planetary gears 22 mesh with the teeth 15a of the left spur gear 15. The second planetary gears 22 are mounted for rotation on respective shafts 23. The second planetary gears 22 are restrained from moving axially to the left relative to the shafts 23 by enlarged diameter shoulders 23a formed thereon. First thrust washers 23b are disposed about the shafts 23 between the left ends of the second planetary gears 22 and the shoulders 23a. Similarly, the second planetary gears are restrained from moving axially to the right relative to the shafts 23 by snap rings 24 connected to the shafts 23. Second thrust washers 24a are disposed about the shafts 23 between the right ends of the second planetary gears 22 and the snap rings 24.

Unlike the shafts 21 supporting the first planetary gears 20, however, the shafts 23 supporting the second planetary gears 22 are axially movable relative to the case of the differential 10. As shown in FIGS. 1 and 3, the shafts 23 are journalled for axial movement in respective aligned axial bores 25 and 26 formed through the case halves 11 and 12, respectively. An annular channel 27 is formed in the end of the left case half 11, communicating with each of the bores 25. The purpose of this annular channel 27 will be explained below. The bores 26 through the second case half 12 are formed having axially extending grooves 26a. Keys 28 provided on the ends of the shafts 23 cooperate with the grooves 26a so as to prevent rotation of the shafts 23 relative to the case halves 11 and 12, while permitting relative axial movement between a first position (the engaged position illustrated in FIG. 1) and a second position (the disengaged position illustrated in FIG. 3).

When the shafts 23 are in the engaged position, the second planetary gears 22 are generally axially aligned with the first planetary gears 20. Therefore, the second planetary gears 22 mesh with the first planetary gears 20 in pairs (see FIG. 2). As a result, rotation of the case of the differential 10 causes rotation of the spur gears 15 and 16 in an known manner. However, when the shafts 23 are in the disengaged position, the second planetary gears 22 are axially displaced from the first planetary gears 20. Therefore, the second planetary gears 22 do not mesh with the first planetary gears 20. As a result, rotation of the case of the differential 10 does not cause rotation of the spur gears 15 and 16. Rather, the spur gears 15 and 16 (and the first and second planetary gears 20 and 22 engaged therewith) rotate freely relative to the case of the differential 10.

Means are provided for moving the shafts 23 (and the second planetary gears 22 mounted thereon) between the engaged and disengaged positions. In the embodiment shown in FIGS. 1 and 3, an annular piston 30 is secured to the ends of each of the shafts 23 by a plurality of threaded fasteners 31 (only one is illustrated). Thus, axial movement of the piston 30 causes simultaneous axial movement of each of the shafts 23 and the second planetary gears 22 mounted thereon. The piston 30 is disposed within the annular channel 27 formed in the end of the left case half 11. Seals 32 and 33 are provided on the inner and outer circumferential surfaces of the piston 30 for engaging the corresponding surfaces of the annular channel 27 in an air-tight manner.

A plurality of counterbores 35 (only one is illustrated) are formed in the first case half 11 extending axially toward the right from the annular channel 27. Within each of the counterbores 35, a spring 36 is disposed. The springs 36 react axially against the piston 30, urging it toward the left to the disengaged position illustrated in FIG. 3. Consequently, the shafts 23 and the second planetary gears 22 are also urged toward the disengaged position.

An adapter ring 40 is mounted about the left end of the left case half 11 by a pair of air-tight seals 41 and 42. The adapter ring 40 and the seals 41 and 42 are retained on the left case half 11 by a retainer ring 43, which is press fit thereon. The adapter ring 40, the seals 41 and 42, and the outer surface of the left case half 11 define an annular chamber 45. A plurality of radial passageways 46 (only one is illustrated) provided communication between the annular chamber 45 and the interior portion of the annular channel 27 (i.e., that portion of the annular channel 27 which is located to the right of the piston 30 and the seals 32 and 33). A conventional pneumatic fitting 47 is connected to the adapter ring 40 for providing selective communication between the annular chamber 45 and a conventional source of vacuum (not shown), preferably vacuum created by the engine of the vehicle.

As discussed above, the springs 36 urge the piston 30, the shafts 23, and the second planetary gears 22 toward the left to the disengaged position illustrated in FIG. 3. When the fitting 47 is connected to the source of vacuum, the air contained within annular chamber 45, the radial passageways 46, and the interior portion of the annular channel 27 is evacuated. As a result, a pressure differential is created across the piston 30. This pressure differential exerts a force on the piston 30, urging it toward the right against the urging of the springs 36. The springs 36 are selected such that the force exerted thereby is less than the force created by the pressure differential. Consequently, the piston 30, the shafts 23, and the second planetary gears 22 are moved toward the right to the engaged position illustrated in FIG. 1.

When it is desired to move the piston 30 back to the disengaged position illustrated in FIG. 3, the fitting 47 is simply vented to the atmosphere. This venting eliminates the pressure differential created across the piston 30 by the vacuum. Therefore, the springs 36 can to urge the piston 30 back to the disengaged position illustrated in FIG. 3. Any known switching means may be used to control when the fitting 47 is connected to the vacuum source and when the fitting 47 is vented to the atmosphere.

Figure 4:
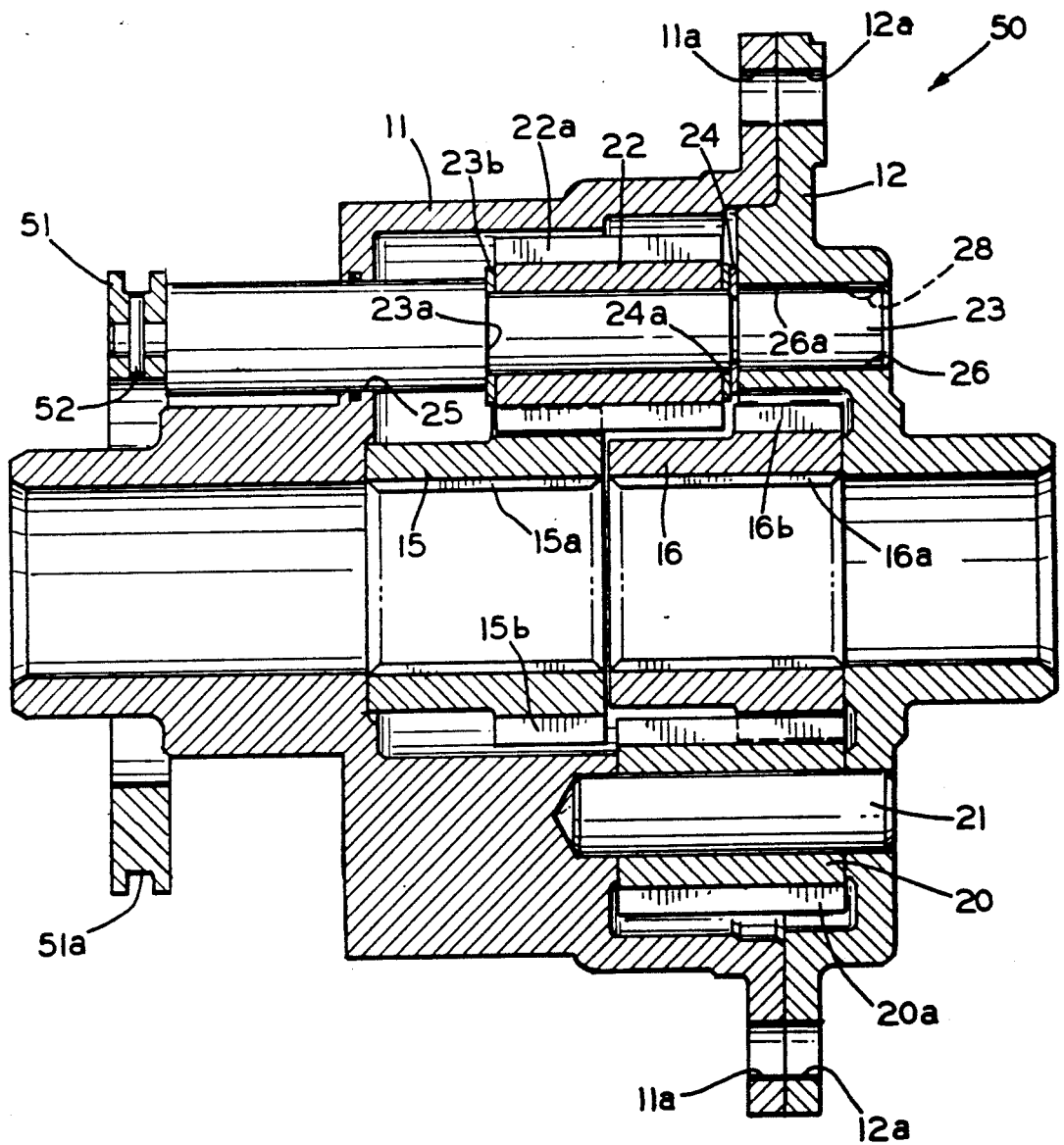
FIG. 4 is a sectional elevational view of a second embodiment of a differential having an internal disconnect mechanism in accordance with this invention, wherein the components of differential are shown in an engaged mode.
Figure 5:
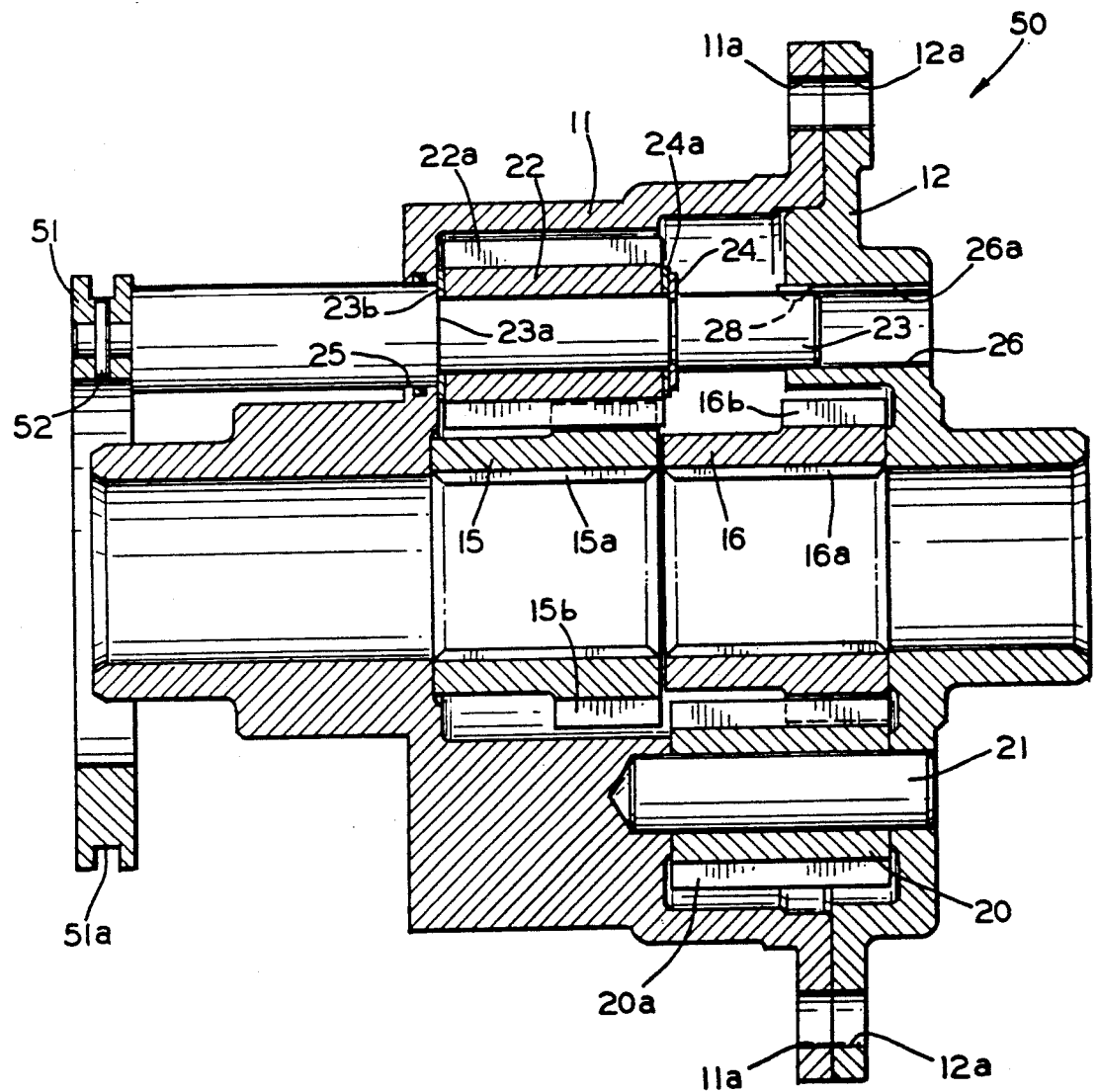
FIG. 5 is a sectional elevational view similar to FIG. 4 wherein the components of the differential are shown in a disengaged mode.

Referring now to FIGS. 4 and 5, there is illustrated a second embodiment of a differential, indicated generally at 50, in accordance with this invention. Most of the components of the differential 50 are similar to the differential 10 described and illustrated above, and like reference numerals are used to designate same. Unlike the previously described differential 10, the differential 50 does not use vacuum to move the shafts 23 and the second planetary gears 22 between the engaged and disengaged positions. Rather, the ends of the shafts 23 are connected to an annular collar 51 located outside of the left case half 11 of the differential 50. This connection may be effected by means of a plurality of transverse pins 52 (only one is illustrated) which are press fit into aligned apertures formed through the collar 51 and the shafts 23.

The collar 51 is formed having a circumferential groove 51a which is adapted to receive a conventional shift fork (not shown) therein. The shift fork is connected to a conventional mechanical linkage which is manually operable to move axially to the left and right. Such axial movement causes corresponding movement of the shafts 23 and the second planetary gears 22. Thus, the differential 50 can function in both the engaged and disengaged modes as described above.

In accordance with the provisions of the patent statutes, the principle and mode of operation of this invention have been explained and illustrated in its preferred embodiment. However, it must be understood that this invention may be practices otherwise than as specifically explained and illustrated without departing from its spirit or scope.

What is claimed is:

1. A differential comprising:
a case adapted to rotate about an axis;
first and second output gears disposed within said case for rotation relative thereto, each of said output gears adapted to be connected to an output shaft;
a first plurality of planetary gears disposed within said case for rotation relative thereto, each of said first plurality of planetary gears meshing with said first output gear;
a secondary plurality of planetary gears disposed within said case for rotation relative thereto, each of said second plurality of planetary gears meshing with said second output gear; and
means for moving said second plurality of planetary gears between an engaged position, wherein each of said second plurality of planetary gears meshes with a corresponding one of said first plurality of planetary gears, and a disengaged position, wherein none of said second plurality of planetary gears mesh with said first plurality of planetary gears.

2. The invention defined in claim 1 wherein each of said first plurality of planetary gears is mounted for rotation on a first shaft supported within said case, said first shafts being axially immovable relative to said case.

3. The invention defined in claim 2 wherein each of said second plurality of planetary gears is mounted for rotation on a second shaft supported within said case, said second shafts being axially movable relative to said case between said engaged and disengaged positions.

4. The invention defined in claim 3 wherein said means for moving said second plurality of planetary gears includes an annular channel formed in said case, an annular piston disposed in said annular channel and connected to each of said second shafts for movement therewith, and means for creating a pressure differential across said piston to move said piston, said second shafts, and said second plurality of planetary gears between said engaged and disengaged positions.

5. The invention defined in claim 4 wherein said means for creating a pressure differential includes means for evacuating a portion of said annular chamber.

6. The invention defined in claim 5 wherein said means for evacuating a portion of said annular channel includes an annular member disposed about said case defining an annular chamber, means for providing communication between said annular chamber and said annular channel, and means for connecting said annular chamber to a source of vacuum.

7. The invention defined in claim 6 wherein said annular chamber extends concentrically about said annular channel, and wherein said means for providing communication includes a plurality of passageways extending radially between said annular chamber and said annular channel.

8. The invention defined in claim 6 further including means for urging said second plurality of planetary gears toward said disengaged position.

9. The invention defined in claim 8 wherein said means for urging includes a spring means reacting against said piston for urging said piston, said second shafts, and said second plurality of planetary gears toward said disengaged position.

10. The invention defined in claim 9 wherein said spring means includes a plurality of counterbores formed in said case and a spring disposed in each of said counterbores, said springs engaging said piston.

11. The invention defined in claim 3 wherein said means for moving said second plurality of planetary gears includes an annular collar disposed outside of said case and connected to each of said second shafts for movement therewith, and means for moving said collar so as to move said second shafts and said second plurality of planetary gears between said engaged and disengaged positions.

12. The invention defined in claim 11 wherein said annular collar is formed having a circumferential groove adapted to receive a shift fork therein.

* * * * *